United States Patent
Yamamoto et al.

(10) Patent No.: US 12,051,424 B2
(45) Date of Patent: Jul. 30, 2024

(54) AUDIO PROCESSING APPARATUS, AUDIO PROCESSING METHOD, AND COMPUTER-READABLE RECORDING MEDIUM

(71) Applicant: NEC Corporation, Tokyo (JP)

(72) Inventors: Hitoshi Yamamoto, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 614 days.

(21) Appl. No.: 17/288,154

(22) PCT Filed: Oct. 25, 2018

(86) PCT No.: PCT/JP2018/039735
§ 371 (c)(1),
(2) Date: Apr. 23, 2021

(87) PCT Pub. No.: WO2020/084741
PCT Pub. Date: Apr. 30, 2020

(65) Prior Publication Data
US 2022/0005482 A1    Jan. 6, 2022

(51) Int. Cl.
*G10L 17/04*     (2013.01)
*G10L 21/04*     (2013.01)

(52) U.S. Cl.
CPC .............. *G10L 17/04* (2013.01); *G10L 21/04* (2013.01)

(58) Field of Classification Search
CPC ........ G10L 17/04; G10L 21/04; G10L 21/038
See application file for complete search history.

(56) References Cited

U.S. PATENT DOCUMENTS

| | | | |
|---|---|---|---|
| 4,783,802 A | | 11/1988 | Takebayashi et al. |
| 5,913,187 A | * | 6/1999 | Mermelstein ....... G10L 21/0208 704/223 |
| 2015/0213790 A1 | * | 7/2015 | Oh ............................ H04S 3/02 381/23 |
| 2015/0317985 A1 | * | 11/2015 | Biswas ................... G10L 19/04 704/500 |
| 2017/0200092 A1 | | 7/2017 | Kisilev |
| 2017/0323644 A1 | | 11/2017 | Kawato |

(Continued)

FOREIGN PATENT DOCUMENTS

| | | |
|---|---|---|
| JP | S61-084694 A | 4/1986 |
| JP | H04-295900 A | 10/1992 |
| JP | S63-078200 A | 4/1998 |

(Continued)

OTHER PUBLICATIONS

Extended European Search Report for EP Application No. EP18937772.4 dated on Oct. 5, 2021.

(Continued)

*Primary Examiner* — Huyen X Vo

(57) ABSTRACT

An audio processing apparatus 100 is apparatus for generating a training data in speaker recognition. The audio processing apparatus 100 includes a data acquisition unit configured to acquire an audio signal that is a source of the training data as sample data, a data generation unit configured to executes signal processing on the acquired sample data, and to generates a new audio signal as the training data whose similarity with the sample data is within the set range.

19 Claims, 12 Drawing Sheets

(56) References Cited

U.S. PATENT DOCUMENTS

2018/0247183 A1    8/2018  Kanebako
2018/0358028 A1*  12/2018  Biswas ................. H03G 7/002

FOREIGN PATENT DOCUMENTS

| | | |
|---|---|---|
| JP | 2003-022088 A | 1/2003 |
| JP | 2018-139071 A | 9/2018 |
| WO | 2016-092807 A1 | 6/2016 |

OTHER PUBLICATIONS

Chien Jen-Tzung et al: "Adversarial Learning and Augmentation for Speaker Recognition", The Speaker and Language Recognition Workshop (Odyssey 2018), Jun. 26, 2018 (Jun. 26, 2018), pp. 342-348, France.

Hsu Wei-Ning et al: "Unsupervised domain adaptation for robust speech recognition via variational autoencoder-based data augmentation", 2017 IEEE Automatic Speech Recognition and Understanding Workshop (ASRU), IEEE, Dec. 16, 2017 (Dec. 16, 2017), pp. 16-23.

Zhang Jingjing et al: "Isolated Word Recognition with Audio Derivation and CNN", 2017 IEEE 29th International Conference On Tools With Artificial Intelligence (ICTAI), IEEE, Nov. 6, 2017 (Nov. 6, 2017), pp. 336-341.

International Search Report for PCT Application No. PCT/JP2018/039735, mailed on Jan. 15, 2019.

Hiromitsu Nishizaki et al., "Expansion of Acoustic Model Learning Data Used in Sound Codec and Variational Autoencoder", Proceedings of the 2017 Autumn Meeting of the Acoustical Society of Japan, Sep. 11, 2017, pp. 87-90.

JP Office Action for JP Application No. 2020-552456, mailed on May 31, 2022 with English Translation.

English translation of Written opinion for PCT Application No. PCT/JP2018/039735, mailed on Jan. 15, 2019.

* cited by examiner

AUDIO PROCESSING APPARATUS, AUDIO PROCESSING METHOD, AND COMPUTER-READABLE RECORDING MEDIUM

This application is a National Stage Entry of PCT/JP2018/039735 filed on Oct. 25, 2018, the contents of all of which are incorporated herein by reference, in their entirety.

TECHNICAL FIELD

The example embodiments relate to an audio processing device and a audio processing method for generating training data necessary for speaker recognition, and further relates to a computer-readable recording medium on which a program for realizing these is recorded.

BACKGROUND ART

Conventionally, in the field of speech recognition, not only the process of converting a speech signal into text data, but also the process of extracting speech features from the audio signal and identifying the speaker based on the extracted features (speaker recognition) is performed.

Here, speaker recognition will be described. Patent Document 1 discloses a system for speaker recognition. The system disclosed in Patent Document 1 first extracts a feature of a person's utterance from the input audio signal when the audio signal is input. Subsequently, the system disclosed in Patent Document 1 collates the extracted feature with features registered in advance, and identifies the speaker based on the collation result.

Further, in the system disclosed in Patent Document 1, features are extracted from an audio signal by a feature extractor. Specifically, the feature extractor uses a model constructed by machine learning to extract the characteristics of the person who spoke from the audio signal. The model is also constructed by optimizing the parameters of the neural network, for example, using training data obtained from a large number of people.

LIST OF RELATED ART DOCUMENTS

Patent Document

Patent Document 1: International Publication No. 2016/092807

SUMMARY OF INVENTION

Problems to be Solved by the Invention

By the way, in the system disclosed in Patent Document 1, in order to improve the identification accuracy of the speaker, it is necessary to improve the extraction accuracy in the feature extractor. And, in order to improve the extraction accuracy in the feature extractor, it is necessary to collect training data from as many people as possible.

However, since the training data is collected by recording individual utterances, there is a problem that it costs a lot to collect the training data from many people. In addition, the cost increases as the number of people to be collected increases. Therefore, in the past, there is a limit to the collection of training data.

An example of an object of the invention is to provide a audio processing apparatus, an audio processing method, and a computer-readable medium that solve the above-described problem, and that can improve an extraction accuracy of the feature extractor while suppressing an increase in a cost of collecting training data required for speaker recognition.

Means for Solving the Problems

To achieve the aforementioned example object, an audio processing apparatus according to an example aspect of the example embodiments is apparatus for generating a training data in speaker recognition, the audio processing apparatus includes:

a data acquisition unit configured to acquire audio signal that is the source of the training data as sample data, a data generation unit configured to executes signal processing on the acquired sample data, and to generates new audio signal as the training data whose similarity with the sample data is within the set range.

Furthermore, to achieve the aforementioned example object, an audio processing method according to an example aspect of the example embodiments is method for generating a training data in speaker recognition, the audio processing method includes:

(a) a step of acquiring audio signal that is the source of the training data as sample data, (b) a step of executing signal processing on the acquired sample data, and generating new audio signal as the training data whose similarity with the sample data is within the set range.

Furthermore, to achieve the aforementioned example object, a computer-readable recording medium records a program for generating a training data in speaker recognition by a computer, the program including an instruction that causes the computer to carry out:

(a) a step of acquiring audio signal that is the source of the training data as sample data, (b) a step of executing signal processing on the acquired sample data, and generating new audio signal as the training data whose similarity with the sample data is within the set range.

Advantageous Effects of the Invention

As described above, according to the example embodiments, an extraction accuracy of the feature extractor can be improved while suppressing an increase in a cost of collecting training data required for speaker recognition.

EXAMPLE EMBODIMENT

First Exemplary Embodiment

Figure 1:
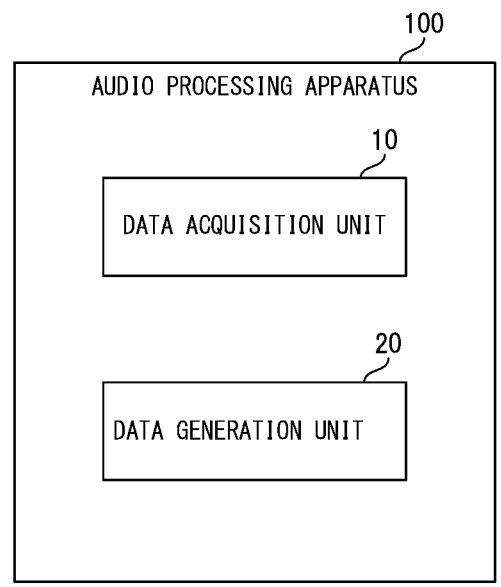
FIG. 1 is a block diagram showing a schematic configuration of a audio processing apparatus according to the first example embodiment.

Hereinafter, an audio processing apparatus, an audio processing method and a program in a first example embodiment will be described with reference to FIGS. 1 to 5.
[Apparatus Configuration]
Initially, schematic configurations of the audio processing apparatus in this first example embodiment will be described using FIG. 1. FIG. 1 is a block diagram showing a schematic configuration of an audio processing apparatus according to the first example embodiment.

The audio processing apparatus 100 according to the first example embodiment shown in FIG. 1 is an apparatus for generating training data in speaker recognition. As shown in FIG. 1, the audio processing apparatus 100 includes a data acquisition unit 10 and a data generation unit 20.

The data acquisition unit 10 acquires a audio signal that is a source of the training data as sample data. The data generation unit 20 executes signal processing on the acquired sample data and generates a new audio signal whose similarity with the sample data is within the set range as training data.

As described above, in the first example embodiment, since the training data required for speaker recognition can be generated from the existing audio signal, it is possible to suppress an increase in the cost for collecting the training data. Further, according to the first example embodiment, since the amount of training data can be easily increased, it is possible to improve extraction accuracy of the feature extractor in speaker recognition.

Figure 2:
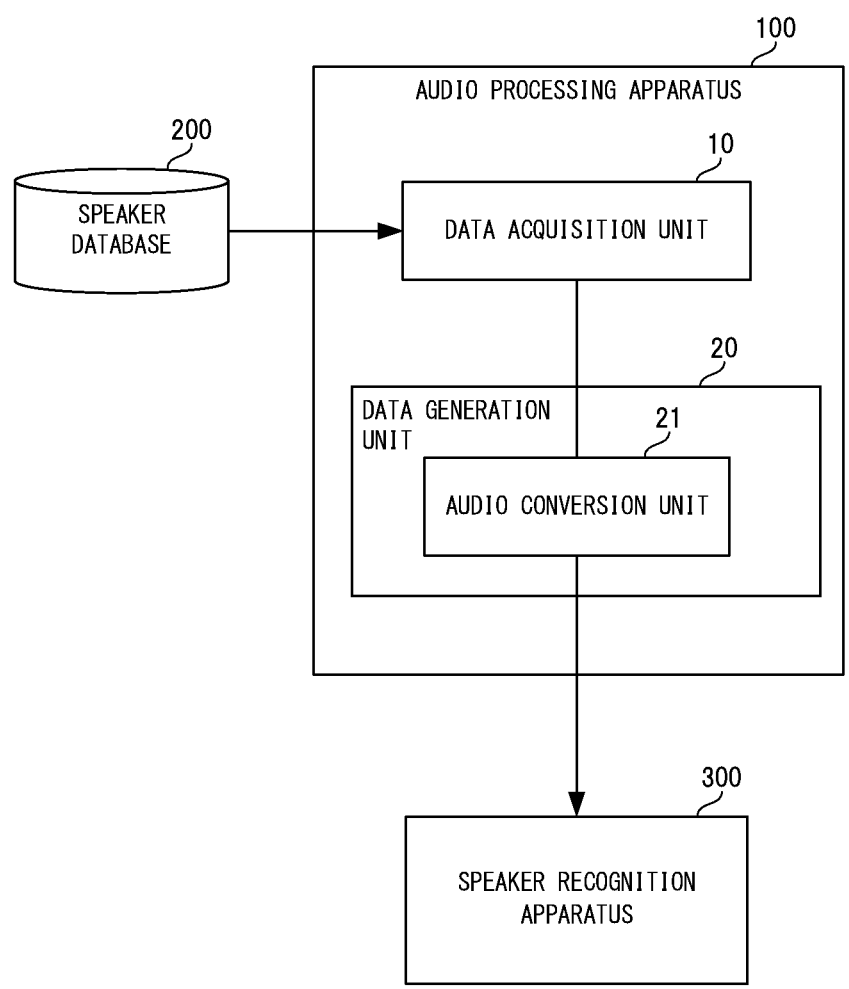
FIG. 2 is a block diagram showing more specifically the configuration of the audio processing apparatus according to the first example embodiment.

Subsequently, a more specific configuration of the audio processing apparatus according to the first example embodiment will be described with reference to FIG. 2. FIG. 2 is a block diagram showing more specifically the configuration of the audio processing apparatus according to the first example embodiment.

As shown in FIG. 2, in the example embodiment, the audio processing apparatus 100 is connected to an external speaker database 200. The speaker database 200 stores the recorded audio signal of the speaker. In the example first embodiment, the data acquisition unit 10 acquires the audio signal to be the sample from the speaker database 200.

As shown in FIG. 2, in the example embodiment, the data generation unit 20 includes an audio conversion unit 21 that executes signal processing. The audio conversion unit 21 executes a process of expanding or contracting the sample data on a time axis or a frequency axis as signal processing.

Specifically, for example the audio conversion unit 21 expands and contracts the audio signal, which is the sample data, on the time axis, and converts the audio signal into an audio signal that imitates a person having a different voice pitch. Further, the audio conversion unit 21 can expands and contracts the audio signal, which is the sample data, on the frequency axis, and convert the audio signal into an audio signal that imitates a person having a different vocal tract length.

Figure 3:
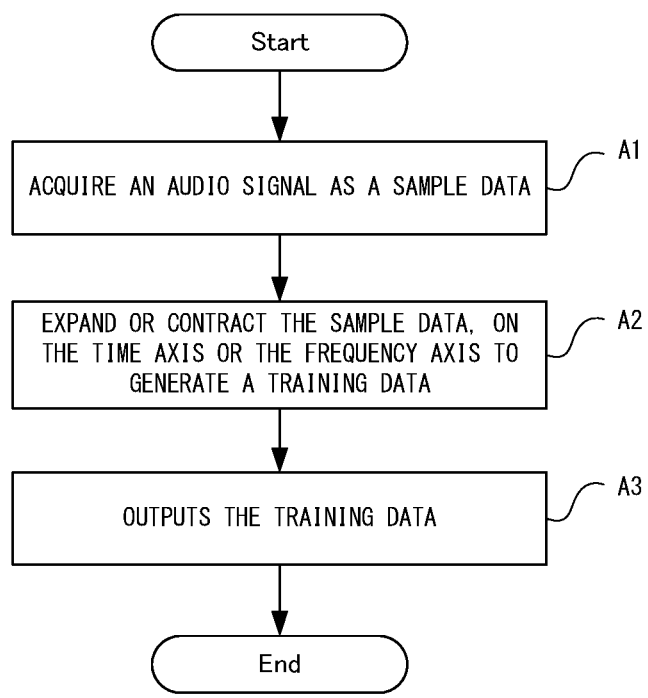
FIG. 3 is a flow diagram showing operation of the audio processing apparatus according to the first example embodiment.

Further, the data generation unit 20 outputs the converted audio signal as training data to the external speaker recognition apparatus 300. In this case, in the speaker recognition apparatus 300, for example, the feature extractor that calculates a feature of the speaker uses the output training data to learns the difference between the speakers. In addition, a speaker collator that evaluates a similarity and calculates a score, and a similarity normalizer that aligns the range of similarity in the speaker can also be learned using this training data.
[Apparatus Operations]
Next, operation of the audio processing apparatus 100 according to the first example embodiment will be described with reference to FIG. 3. FIG. 3 is a flow diagram showing operation of the audio processing apparatus according to the first example embodiment. In the following description, FIG. 1 will be referred to as appropriate. Further, in the first example embodiment, an audio processing method is implemented by operating the audio processing apparatus 100. Therefore, the description of the audio processing method in the first example embodiment is replaced with the following description of the operation of the audio processing apparatus 100.

As shown in FIG. 3, first, the data acquisition unit 10 acquires an audio signal as a sample from the speaker database 200 (step A1).

Next, in the data generation unit 20, the audio conversion unit 21 executes a process of expanding or contracting the audio signal, which is the sample data, on the time axis or the frequency axis to generate a new audio signal as a training data. (Step A2).

After executing step A2, the data generation unit 20 outputs the training data generated in step A2 to the speaker recognition apparatus 300 (step A3). By executing step A3, the processing in the audio processing apparatus 100 is temporarily terminated, but the above-mentioned steps A1 to A3 are repeatedly executed until the necessary training data is prepared by changing the sample audio signals.
[Effect in First Example Embodiment]
As described above, in the first example embodiment, an audio signal imitating a person having a different voice pitch or an audio signal imitating a person having a different vocal tract length can be obtained from the original audio signal. According to the first example embodiment, it is possible to improve the extraction accuracy of the feature extractor in speaker recognition while suppressing an increase in the cost for collecting training data.
[Program]
The program according to the first example embodiment may be a program that causes a computer to execute steps A1 to A3 shown in FIG. 3. By installing this program in a computer and executing the program, the audio processing apparatus 100 and the audio processing method according to the first example embodiment can be realized. In this case, a processor of the computer performs processing to function as the data acquisition unit 10 and the data generation unit 20.

Also, the program according to the first example embodiment may be executed by a computer system constructed by a plurality of computers. In this case, for example, each computer may respectively function as any of the data acquisition unit 10 and the data generation unit 20.

[First Modification]

Figure 4:
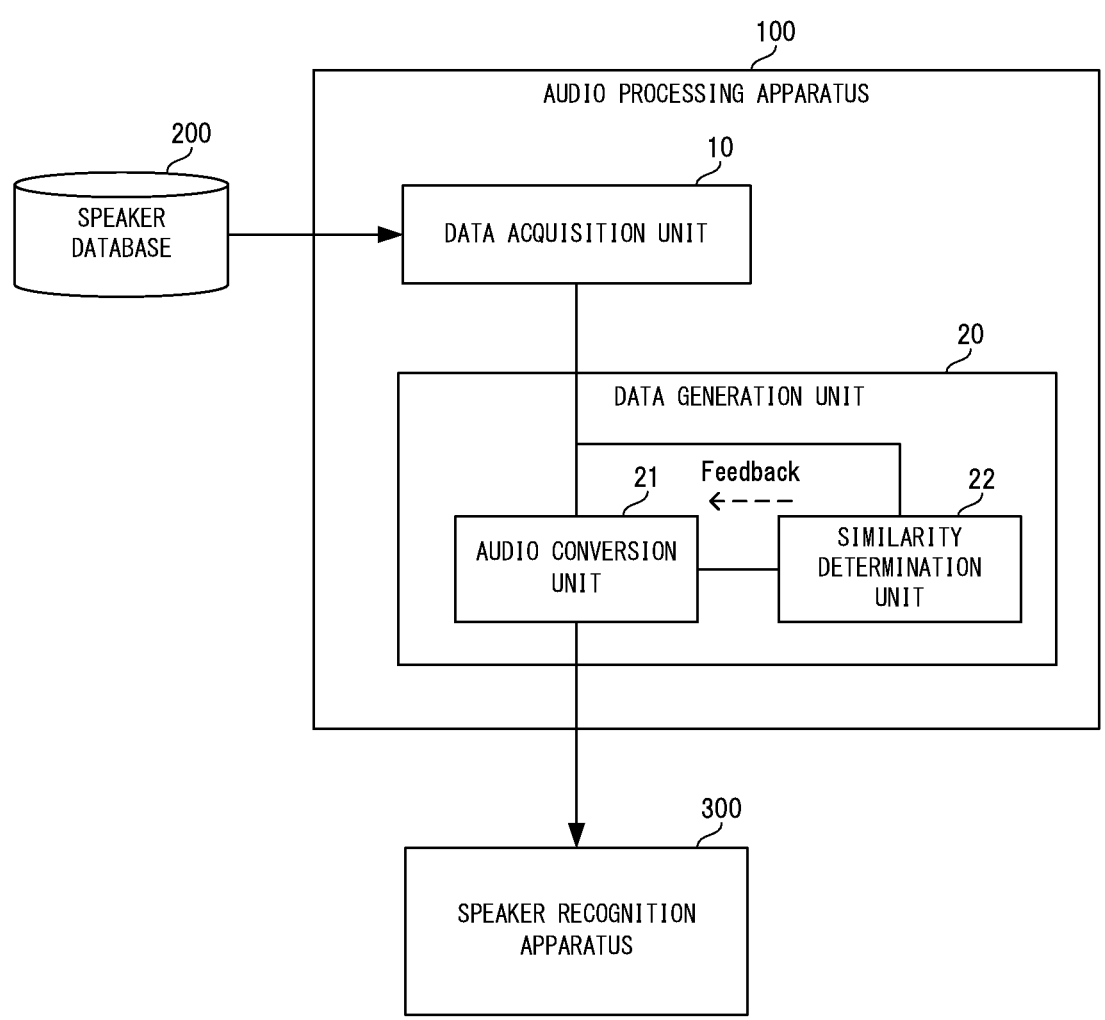
FIG. 4 is a block diagram showing a configuration of an audio processing apparatus according to a first modification of the first example embodiment.

Here, a modification 1 of the audio processing apparatus 100 according to the first example embodiment will be described with reference to FIG. 4. FIG. 4 is a block diagram showing a configuration of an audio processing apparatus according to a first modification of the first example embodiment.

As shown in FIG. 4, in the modification 1, the data generation unit 20 includes a similarity determination unit 22 in addition to the audio conversion unit 21. The data generation unit 20 evaluates the similarity between the audio signal of the existing speaker and the audio signal after conversion by this configuration.

After the signal processing is executed by the audio conversion unit 21, the similarity determination unit 22 obtains the similarity between the speaker feature extracted from the sample data and the speaker feature extracted from the new audio signal as the similarity. Then, when the obtained similarity is not within the set range, the similarity determination unit 22 causes the audio conversion unit 21 to execute the signal processing again.

Specifically, the similarity determination unit 22 extracts an i-vector from the audio signal as a speaker feature, for example, by using an existing method. Further, the similarity determination unit 22 calculates, for example, the cosine similarity as the similarity.

In the modification 1, the audio conversion unit 21 acquires the obtained similarity and performs the conversion process again so that the similarity is within the set range. For example, when the similarity is larger than a predetermined value, that is, when the sample data and the new audio signal are similar, the audio conversion unit 21 executes the conversion process so that the difference in speaker characteristics becomes large.

According to the first modification, it is possible to reliably generate an audio signal of a speaker whose voice quality is different from that of the existing speaker, so that the extraction accuracy of the feature extractor in speaker recognition can be further improved.

[Second Modification]

Figure 5:
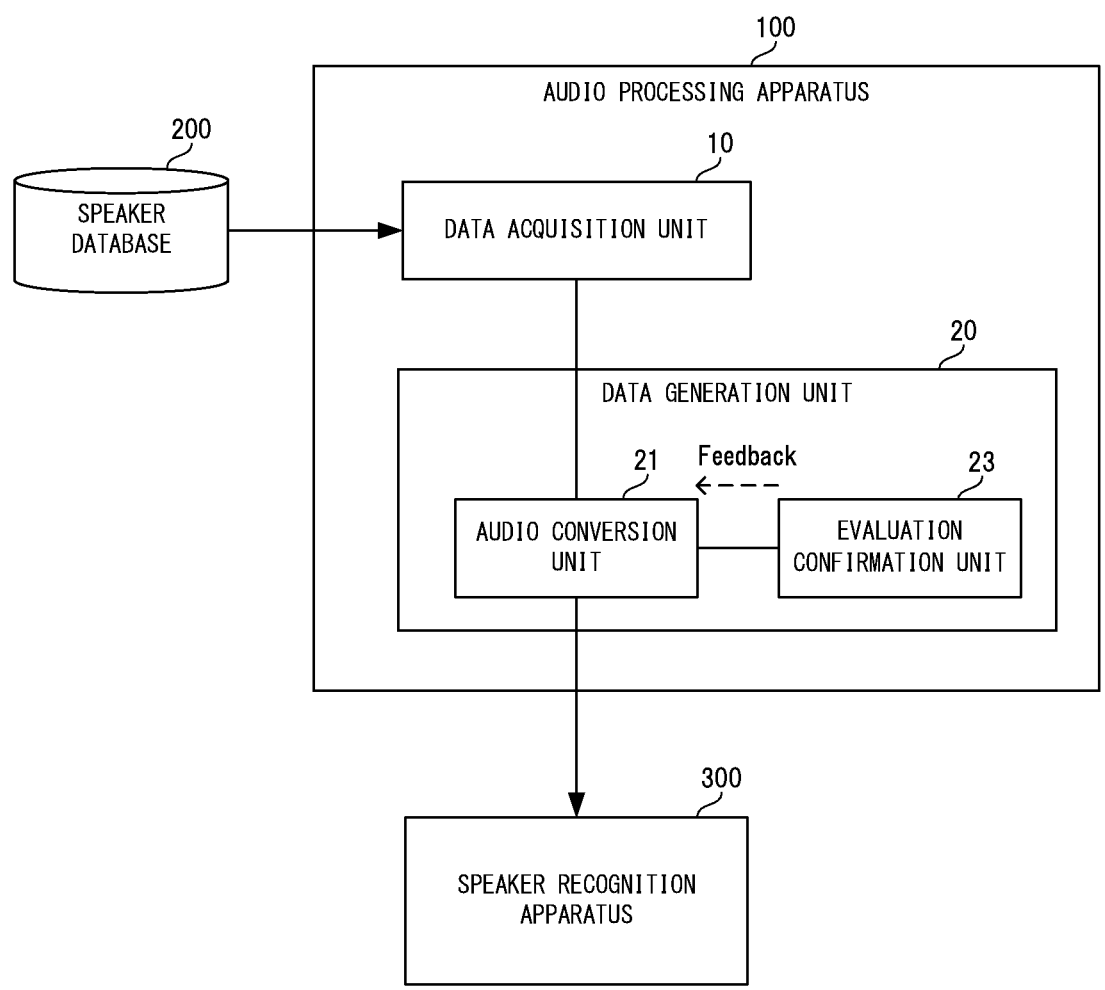
FIG. 5 is a block diagram showing a configuration of an audio processing apparatus according to a second modification of the first example embodiment.

Subsequently, a second modification of the audio processing apparatus 100 according to the first example embodiment will be described with reference to FIG. 5. FIG. 5 is a block diagram showing a configuration of an audio processing apparatus according to a second modification of the first example embodiment.

As shown in FIG. 5, in the modification 2, the data generation unit 20 includes an evaluation confirmation unit 23 in addition to the audio conversion unit 21, evaluates the voice-likeness of the new audio signal after signal processing by this configuration.

The evaluation confirmation unit 23 evaluates a new audio signal after executing the signal processing. Then, when the obtained evaluation result does not fall within the set range, the evaluation confirmation unit 23 causes the audio conversion unit 21 to execute the signal processing again.

Specifically, the evaluation confirmation unit 23 evaluates the voice-likeness of the new audio signal after the conversion process by using the existing method. Examples of the existing method include VAD (Voice Activity Detection) and the like. Further, in the second modification, the audio conversion unit 21 acquires the evaluation result. When the evaluation result is low and the voice-likeness is insufficient, the audio conversion unit 21 executes the conversion process so that the evaluation result is high.

According to the second modification, an audio signal that does not look like a human voice is excluded, so that the extraction accuracy of the feature extractor in speaker recognition can be further improved in this case as well.

Further, the first example embodiment may be a combination of the above-described first and second modification. In this case, the data generation unit 20 includes both the similarity determination unit 22 and the evaluation confirmation unit 23 in addition to the audio conversion unit 21.

Second Exemplary Embodiment

Hereinafter, an audio processing apparatus, an audio processing method and a program in a second example embodiment will be described with reference to FIGS. 6 to 10.

[Apparatus Configuration]

Figure 6:
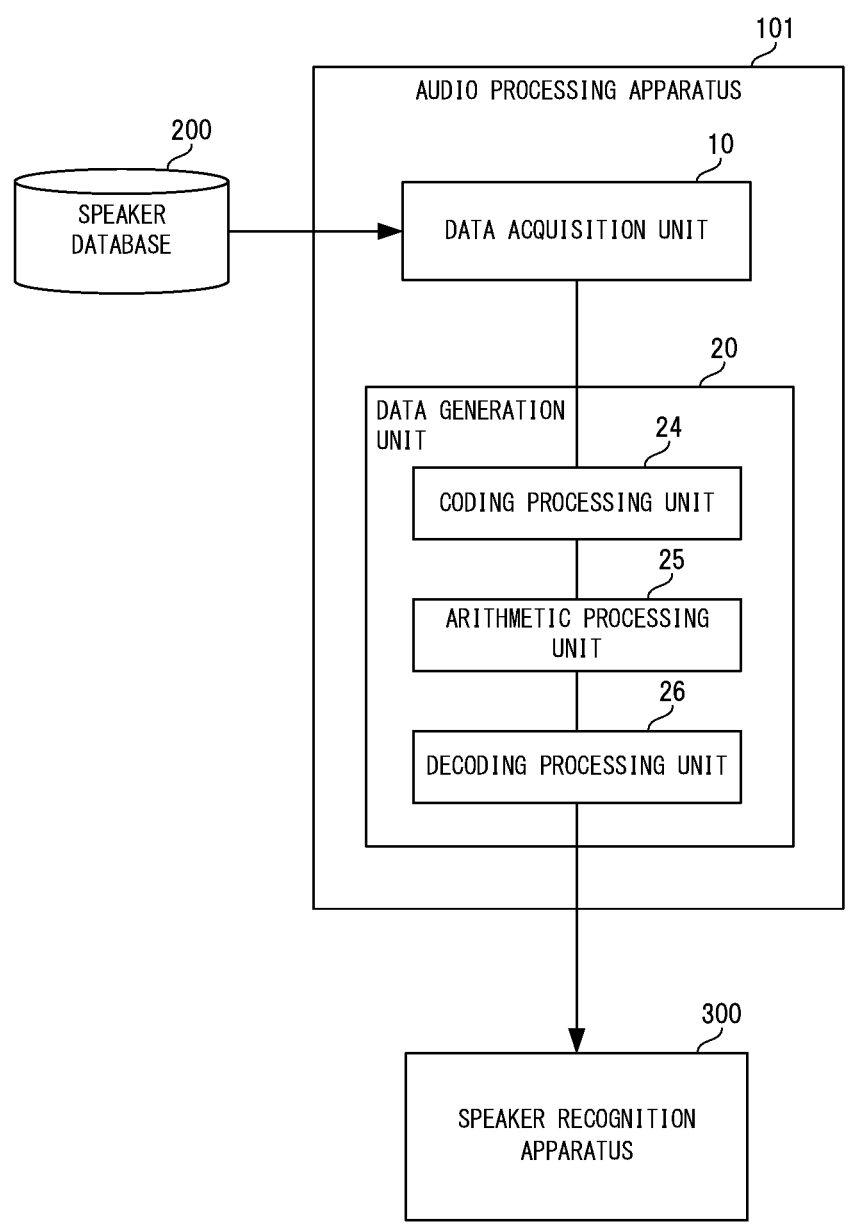
FIG. 6 is a block diagram showing a configuration of an audio processing apparatus according to a second example embodiment.

Initially, configurations of the audio processing apparatus in this second example embodiment will be described using FIG. 6. FIG. 6 is a block diagram showing a configuration of an audio processing apparatus according to the second example embodiment.

The audio processing apparatus 101 according to the second example embodiment shown in FIG. 6 is also an apparatus for generating training data in speaker recognition, like the audio processing apparatus 100 according to the first example embodiment shown in FIGS. 1 and 2. However, in the second example embodiment, the audio processing apparatus 101 is different from the first example embodiment in the configuration and function of the data generation unit 20. Hereinafter, the differences will be mainly described.

In the second example embodiment, the data generation unit 20 includes a coding processing unit 24, an arithmetic processing unit 25, and a decoding processing unit 26. The coding processing unit 24 performs coding processing on the sample data. The arithmetic processing unit 25 performs arithmetic processing on the latent variable obtained by the coding processing. The decoding processing unit 26 executes a decoding process for the arithmetically processed latent variable.

Specifically, the coding processing unit 24 encodes the audio signal using, for example, the coding unit (encoder) of the autoencoder to generate a latent variable, that is, a compressed feature. The arithmetic processing unit 25 adds a random number to the latent variable, for example, as arithmetic processing. The compound processing unit 26 uses the decoding unit (decoder) of the same autoencoder to perform decoding on the latent variable after the arithmetic processing. As a result, a new audio signal is generated. In the second example embodiment, a variational autoencoder may be used as the autoencoder.

In the second example embodiment, as described above, the data generation unit 20 executes coding processing, arithmetic processing, and decoding processing as signal processing. Then, since the arithmetic processing is performed on the latent variable obtained by the coding, the decoded audio signal becomes an audio signal different from the original sample data. The arithmetic processing may be a processing other than the above-mentioned random number addition processing.

[Apparatus Operations]

Figure 7:
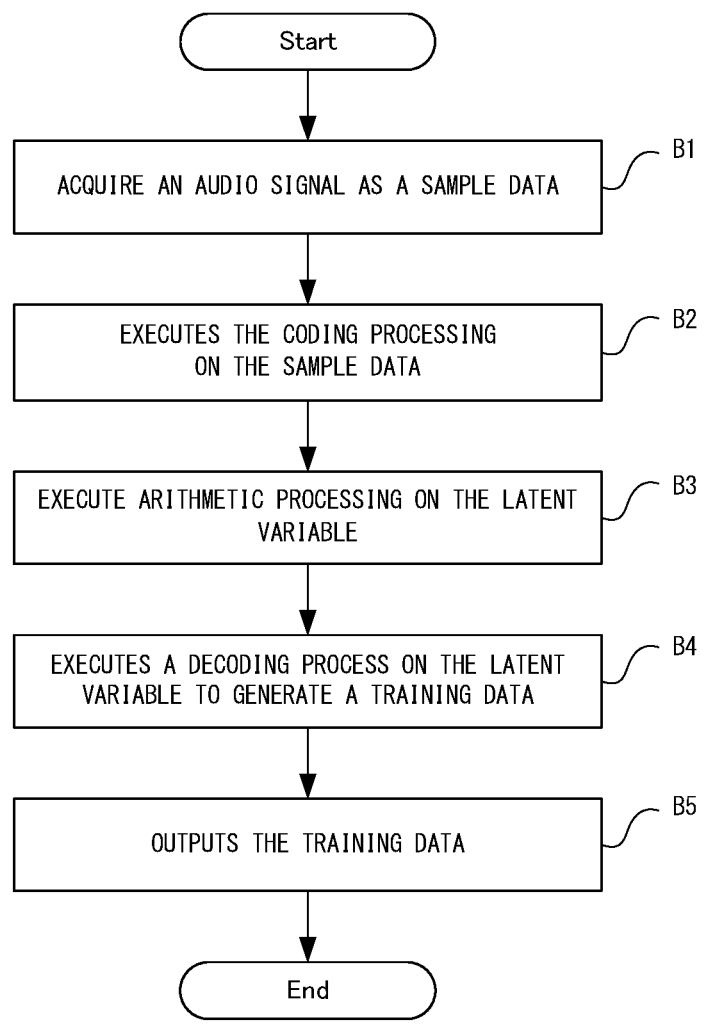
FIG. 7 is a flow diagram showing the operation of the audio processing apparatus according to the second example embodiment.

Next, operation of the audio processing apparatus 101 according to the second example embodiment will be described with reference to FIG. 7. FIG. 7 is a flow diagram showing operation of the audio processing apparatus according to the second example embodiment. In the following description, FIG. 6 will be referred to as appropriate. Further, in the second example embodiment, an audio processing method is implemented by operating the audio processing apparatus 101. Therefore, the description of the audio processing method in the second example embodiment is replaced with the following description of the operation of the audio processing apparatus 101.

As shown in FIG. 7, first, the data acquisition unit 10 acquires a sample audio signal from the speaker database 200 (step B1).

Next, in the data generation unit 20, the coding processing unit 24 executes the coding processing on the sample data (step B2). Subsequently, the arithmetic processing unit 25 executes arithmetic processing on the latent variable obtained by the coding processing in step B2 (step B3). Further, the decoding processing unit 26 executes a decoding process on the latent variable calculated in step B3 to generate a new audio signal (step B4).

After executing step B4, the data generation unit 20 outputs the training data generated in step B4 to the speaker recognition apparatus 300 (step B5). By executing step B5, the processing in the audio processing apparatus 101 is temporarily terminated, but the above-mentioned steps B1 to B5 are repeatedly executed until the necessary training data is prepared by changing the sample audio signal.

[Effect in Second Example Embodiment]

As described above, also in the second example embodiment, the new audio signal different from the original audio signal can be obtained from the original audio signal as in the first example embodiment. Also, in the second example embodiment, it is possible to improve the extraction accuracy of the feature extractor in speaker recognition while suppressing an increase in the cost for collecting training data.

[Program]

The program according to the second example embodiment may be a program that causes a computer to execute steps B1 to B5 shown in FIG. 7. By installing this program in a computer and executing the program, the audio processing apparatus 101 and the audio processing method according to the second example embodiment can be realized. In this case, a processor of the computer performs processing to function as the data acquisition unit 10 and the data generation unit 20.

Also, the program according to the second example embodiment may be executed by a computer system constructed by a plurality of computers. In this case, for example, each computer may respectively function as any of the data acquisition unit 10 and the data generation unit 20.

[First Modification]

Figure 8:
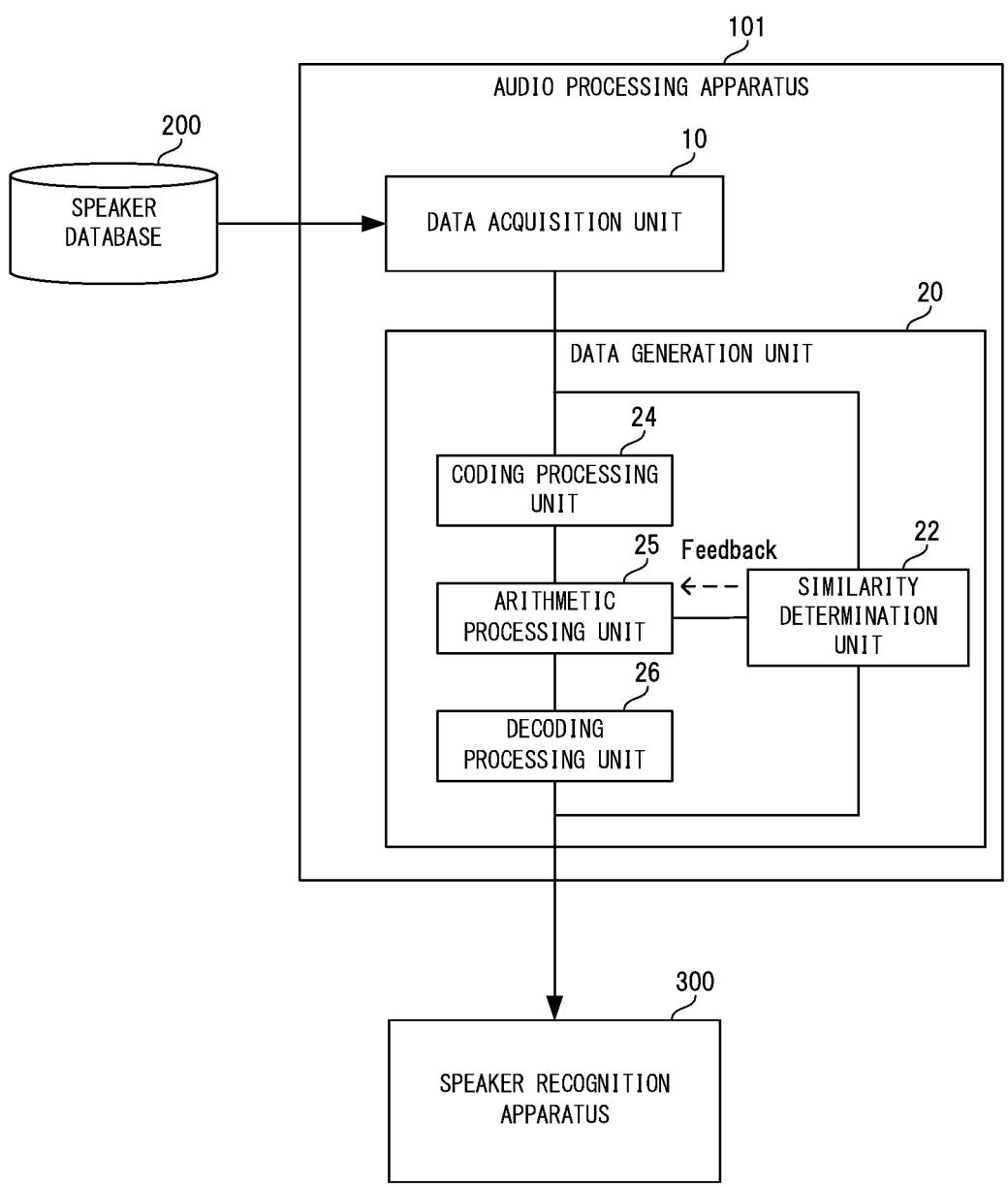
FIG. 8 is a block diagram showing a configuration of an audio processing apparatus according to a first modification of the second example embodiment.

Here, a modification 1 of the audio processing apparatus 101 according to the second example embodiment will be described with reference to FIG. 8. FIG. 8 is a block diagram showing a configuration of an audio processing apparatus according to a first modification of the second example embodiment.

As shown in FIG. 4, in the modification 1, the data generation unit 20 includes a similarity determination unit 22 in addition to the coding processing unit 24, the arithmetic processing unit 25, and the decoding processing unit 26. The data generation unit 20 evaluate the similarity between the audio signal of the existing speaker and the audio signal after conversion by this configuration.

Similar to the first modification of the first example embodiment, after the signal processing is executed by the audio conversion unit 21, the similarity determination unit 22 obtains the similarity between the speaker feature extracted from the sample data and the speaker feature extracted from the new audio signal as the similarity. Then, when the obtained similarity is not within the set range, the similarity determination unit 22 causes the coding processing unit 24, the arithmetic processing unit 25, and the decoding processing unit 26 to execute the signal processing again.

Specifically, also in the first modification, the similarity determination unit 22 extracts an i-vector from the audio signal as a speaker feature, for example, by using an existing method. Further, the similarity determination unit 22 calculates, for example, the cosine similarity as the similarity.

In the first modification, the arithmetic processing unit 25 acquires the obtained similarity and performs arithmetic processing so that the similarity is within the set range. For example, when the similarity is larger than a predetermined value, that is, when the sample data and the new audio signal are similar, the arithmetic processing unit 25 increases the value of the random number to be added and executes the arithmetic processing.

According to the first modification, similarly to the first modification of the first example embodiment, it is possible to reliably generate an audio signal of a speaker whose voice quality is different from that of the existing speaker, so that the extraction accuracy of the feature extractor in speaker recognition can be further improved.

[Second Modification]

Figure 9:
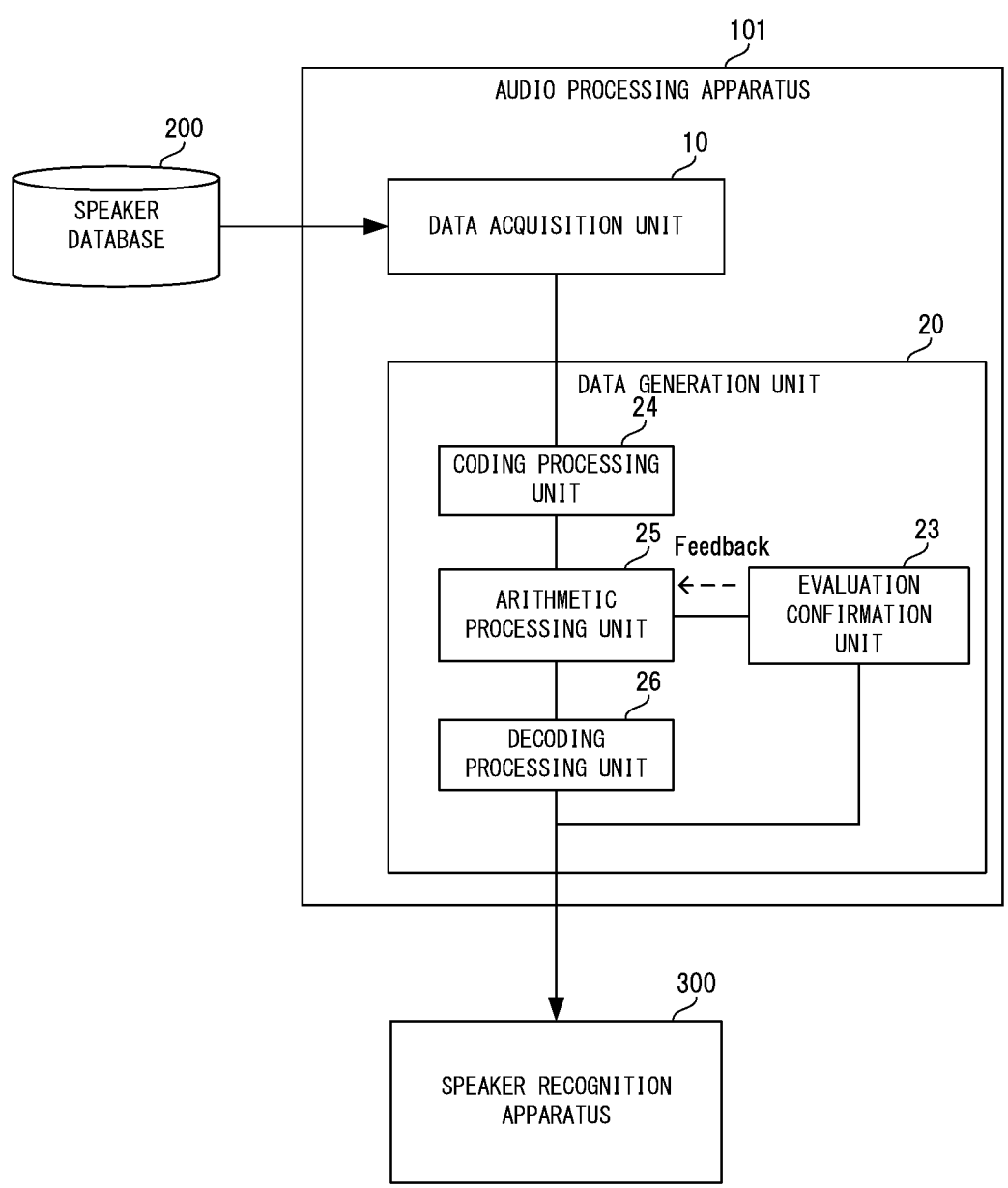
FIG. 9 is a block diagram showing a configuration of an audio processing apparatus according to a second modification of the second example embodiment.

Subsequently, a second modification of the audio processing apparatus 101 according to the second example embodiment will be described with reference to FIG. 9. FIG. 9 is a block diagram showing a configuration of an audio processing apparatus according to a second modification of the second example embodiment.

As shown in FIG. 9, in the second modification, the data generation unit 20 includes an evaluation confirmation unit 23 in addition to the coding processing unit 24, the arithmetic processing unit 25, and the decoding processing unit 26, evaluates the voice-likeness of the new audio signal after processing by this configuration.

The evaluation confirmation unit 23 evaluates a new audio signal after executing the signal processing, as in the second modification of the first example embodiment. Then, when the obtained evaluation result does not fall within the set range, the evaluation confirmation unit 23 causes the coding processing unit 24, the arithmetic processing unit 25, and the decoding processing unit 26 to execute the signal processing again.

Specifically, also in the second modification, the evaluation confirmation unit 23 evaluates the voice-likeness of the new audio signal after the conversion process by using the existing method. Examples of the existing method include VAD (Voice Activity Detection) and the like. Further, in the second modification, the arithmetic processing unit 25 acquires the evaluation result. When the evaluation result is low and the voice-likeness is insufficient, the arithmetic processing unit 25 executes the arithmetic processing so that the evaluation result is high.

According to the second modification, an audio signal that does not look like a human voice is excluded. Therefore, in this case as well, the extraction accuracy of the feature extractor in speaker recognition can be further improved as in the second modification of the first example embodiment.

Further, the second example embodiment may also be a combination of the above-described first and second modification as in the first example embodiment. In this case, the data generation unit 20 includes both the similarity determination unit 22 and the evaluation confirmation unit 23 in addition to the coding processing unit 24, the arithmetic processing unit 25, and the decoding processing unit 26.

[Third Modification]

Figure 10:
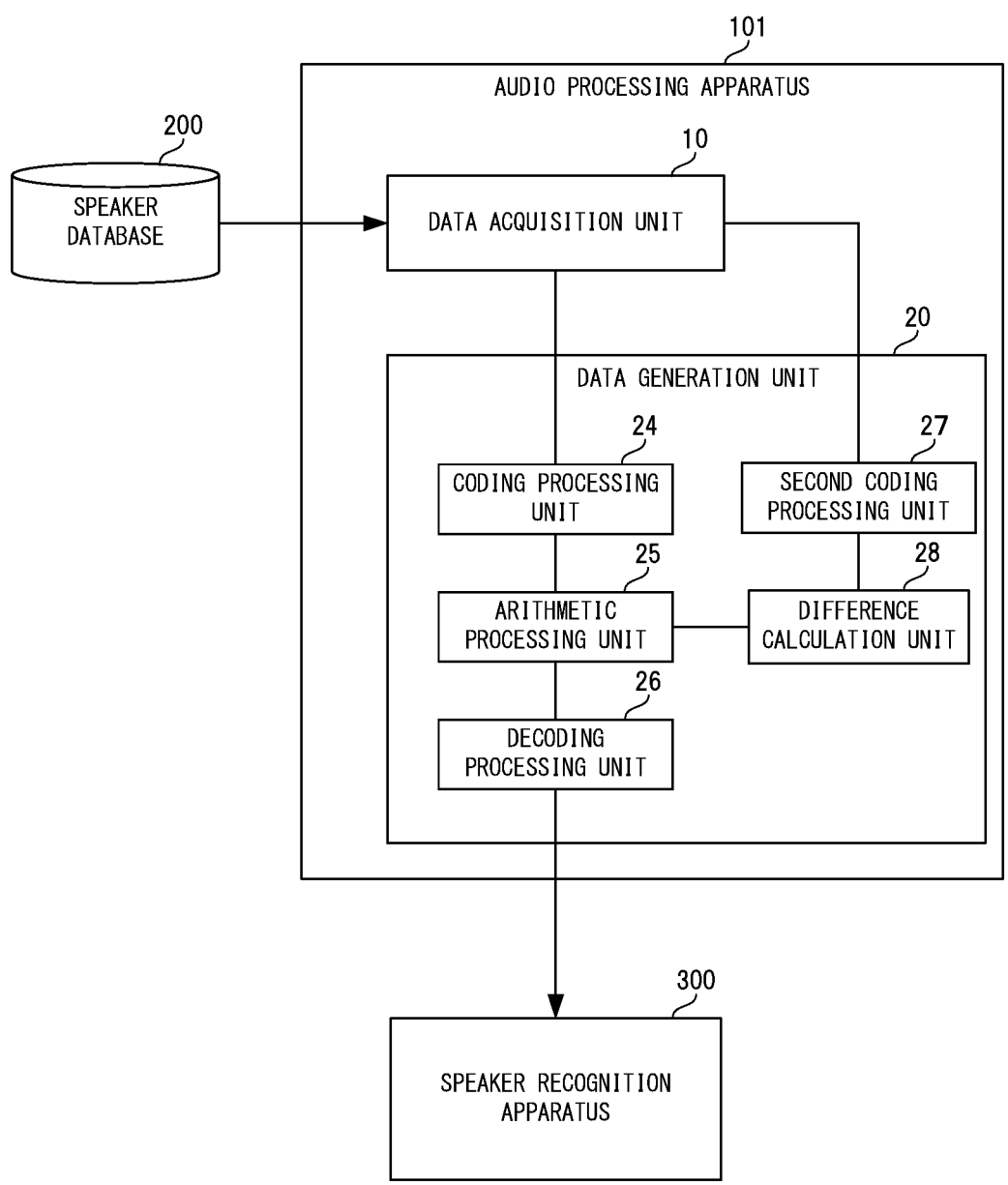
FIG. 10 is a block diagram showing a configuration of an audio processing apparatus according to a third modification of the second example embodiment.

Here, a third modification of the audio processing apparatus 101 according to the second example embodiment will be described with reference to FIGS. 10 and 11. FIG. 10 is a block diagram showing a configuration of an audio processing apparatus according to a third modification of the second example embodiment.

As shown in FIG. 10, in the third modification, the data generation unit 20 includes a second coding processing unit 27 and a difference calculation unit 28 in addition to the coding processing unit 24, the arithmetic processing unit 25, and the decoding processing unit 26.

The second coding processing unit 27 first acquires another audio signal of the speaker of the sample data and an audio signal of a speaker different from the speaker of the sample data, via the data acquisition unit 10, before the signal processing is executed. Then, the second coding processing unit 27 performs coding processing on each of another audio signal of the speaker of the sample data and the audio signal of the speaker different from the speaker of the sample data to generate the latent variables.

The difference calculation unit 28 calculates the difference between the latent variables generated by the second coding processing unit 27. After that, the arithmetic processing unit 25 executes the arithmetic processing using the difference calculated by the difference calculation unit 28.

Subsequently, the process of the data generation unit 20 in the third modification will be specifically described with reference to FIG. 11. FIG. 11 is a diagram specifically showing the processing of the data generation unit in the third modification of the second example embodiment.

Figure 11:
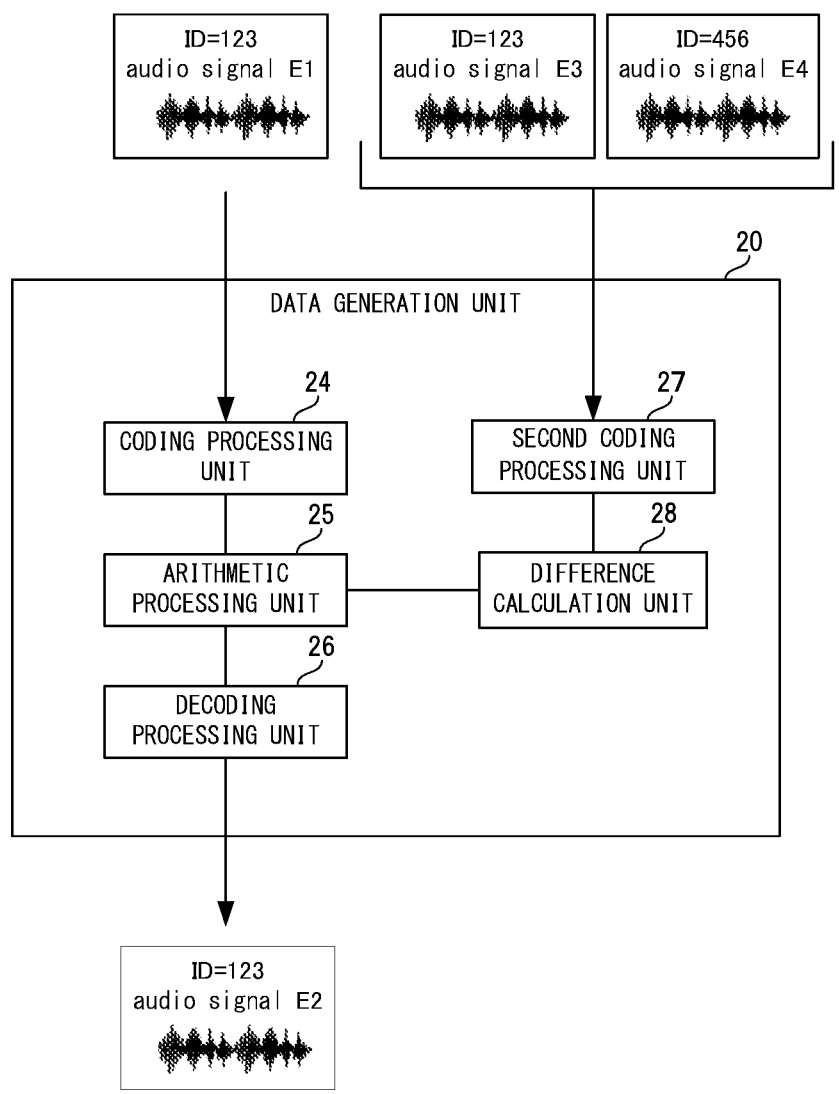
FIG. 11 is a diagram specifically showing the processing of the data generation unit in the third modification of the second example embodiment.

As shown in FIG. 11, first, the sample data is the audio signal of the audio signal E1. Further, the speaker of the sample data is a speaker whose identification number (ID) is 123. In this case, audio signal E3 different from the sample data of the speaker of ID 123 and audio signal E4 of the speaker of ID 456 are input to the second coding processing unit 27 via the data acquisition unit 10.

Therefore, the second coding processing unit 27 generates a latent variable of the audio signal E3 and a latent variable of the audio signal E4, and inputs these to the difference calculation unit 28. The difference calculation unit 28 calculates the difference D between the two-input latent variables and inputs the calculated difference D to the arithmetic processing unit 25.

Then, since the coding processing unit 24 generates the latent variable of the audio signal E1 which is the sample data, the arithmetic processing unit 25 performs arithmetic processing on the latent variable of the audio signal E1 using the input difference D. Examples of the arithmetic processing performed in this case include addition processing of the difference D to the latent variable of the audio signal E1. Further, in this case, the difference D may be multiplied by a predetermined coefficient α. After that, the code processing unit 16 executes code processing on the latent variable after the arithmetic processing to generate a new audio signal E2.

According to the third modification, a new audio signal can be generated based on the difference between the existing speakers, so that the extraction accuracy of the feature extractor in speaker recognition can be further improved.

[Physical Configuration]

Figure 12:
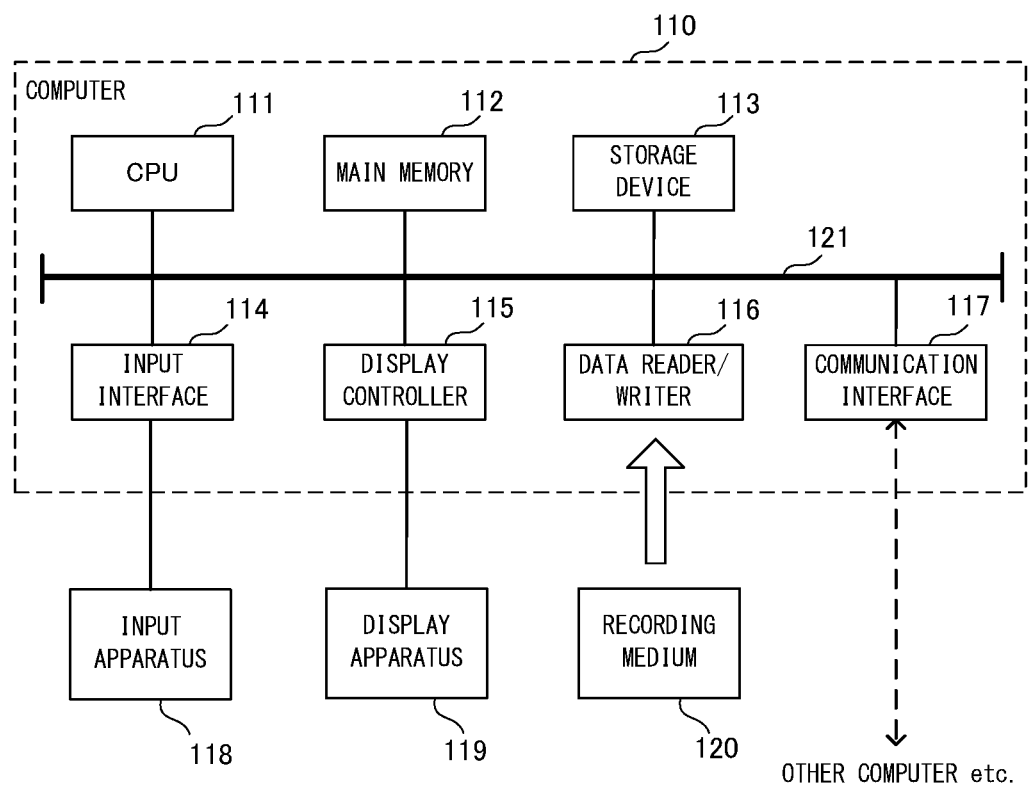
FIG. 12 is a block diagram showing an example of a computer that realizes the audio processing apparatus according to the first and second example embodiments.

Using FIG. 12, the following describes a computer that realizes the audio processing apparatus by executing the program according to the example embodiment. FIG. 12 is a block diagram showing an example of a computer that realizes the audio processing apparatus according to the first and second example embodiment.

As shown in FIG. 12, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121. Note that the computer 110 may include a GPU (Graphics Processing Unit) or an FPGA (Field-Programmable Gate Array) in addition to the CPU 111, or in place of the CPU 111.

The CPU 111 carries out various types of calculation by deploying the program (codes) according to the example embodiment stored in the storage device 113 to the main memory 112 and executing the codes in a predetermined order. The main memory 112 is typically a volatile storage device, such as a DRAM (dynamic random-access memory). Also, the program according to the example embodiment is provided in a state where it is stored in a computer-readable recording medium 120. Note that the program according to the example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input apparatus 118, such as a keyboard and a mouse. The display controller 115 is connected to a display apparatus 119, and controls display on the display apparatus 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include: a general-purpose semiconductor storage device, such as CF (CompactFlash®) and SD (Secure Digital); a magnetic recording medium, such as a flexible disk; and an optical recording medium, such as a CD-ROM (Compact Disk Read Only Memory).

Note that the voice processing apparatus 100 according to the example embodiment can also be realized by using items of hardware that respectively correspond to the components, rather than the computer in which the program is installed. Furthermore, a part of the voice processing apparatus 100 may be realized by the program, and the remaining part of the voice processing apparatus 100 may be realized by hardware.

A part or an entirety of the above-described example embodiment can be represented by (Supplementary Note 1)

to (Supplementary Note 18) described below but is not limited to the description below.

(Supplementary Note 1)

An audio processing apparatus for generating a training data in speaker recognition, the audio processing apparatus including:

a data acquisition unit configured to acquire an audio signal that is a source of the training data as sample data, a data generation unit configured to executes signal processing on the acquired sample data, and to generates a new audio signal as the training data whose similarity with the sample data is within the set range.

(Supplementary Note 2)

The audio processing apparatus according to Supplementary Note 1, wherein the data generation unit executes a process of expanding or contracting the sample data on a time axis or a frequency axis as the signal processing.

(Supplementary Note 3)

The audio processing apparatus according to Supplementary Note 1, wherein the data generation unit executes, as the signal processing, a coding process for the sample data, an arithmetic process for a latent variable obtained by the coding process, and a decoding process for the latent variable that has been arithmetically processed.

(Supplementary Note 4)

The audio processing apparatus according to any of Supplementary Notes 1 to 3, wherein the data generation unit, after executing the signal processing, obtains a similarity between a speaker feature extracted from the sample data and a speaker feature extracted from the new audio signal as the similarity, if obtained similarity is not within the set range, the signal processing is executed again.

(Supplementary Note 5)

The audio processing apparatus according to any of Supplementary Notes 1 to 4, wherein the data generation unit evaluates the new audio signal after executing the signal processing, if the evaluation result does not fall within the set range, the data generation unit executes the signal processing again.

(Supplementary Note 6)

The audio processing apparatus according to Supplementary Note 3, wherein the data generation unit, prior to the signal processing, executes coding processing on another audio signal of the speaker of the sample data and an audio signal of a speaker different from the speaker of the sample data to generate latent variables, calculate the difference between the generated latent variables, and executes the arithmetic processing using the calculated difference in the signal processing.

(Supplementary Note 7)

An audio processing method for generating a training data in speaker recognition, the audio processing method including:

(a) a step of acquiring an audio signal that is a source of the training data as sample data, (b) a step of executing signal processing on the acquired sample data and generating a new audio signal as the training data whose similarity with the sample data is within the set range.

(Supplementary Note 8)

The audio processing method according to Supplementary Note 7, wherein in the (b) step, a process of expanding or contracting the sample data is executed on a time axis or a frequency axis as the signal processing.

(Supplementary Note 9)

The audio processing method according to Supplementary Note 7, wherein in the (b) step, a coding process for the sample data, an arithmetic process for a latent variable obtained by the coding process, and a decoding process for the latent variable that has been arithmetically processed are executed as the signal processing.

(Supplementary Note 10)

The audio processing method according to any of Supplementary Notes 7 to 9, wherein in the (b) step, after executing the signal processing, a similarity between a speaker feature extracted from the sample data and a speaker feature extracted from the new audio signal is obtained as the similarity, if obtained similarity is not within the set range, the signal processing is executed again.

(Supplementary Note 11)

The audio processing method according to any of Supplementary Notes 7 to 9, wherein in the (b) step, the new audio signal is evaluated after executing the signal processing, if the evaluation result does not fall within the set range, the signal processing is executed again.

(Supplementary Note 12)

The audio processing method according to Supplementary Note 9, wherein in the (b) step, prior to the signal processing, coding processing on another audio signal of the speaker of the sample data and an audio signal of a speaker different from the speaker of the sample data is executed to generate latent variables, the difference between the generated latent variables is calculated, and the arithmetic processing using the calculated difference is executed in the signal processing.

(Supplementary Note 13)

A computer-readable recording medium that records a program for generating a training data in speaker recognition by a computer, the program including an instruction that causes the computer to carry out:

(a) a step of acquiring an audio signal that is a source of the training data as sample data, (b) a step of executing signal processing on the acquired sample data and generating a new audio signal as the training data whose similarity with the sample data is within the set range.

(Supplementary Note 14)

The computer-readable recording medium according to Supplementary Note 13, wherein in the (b) step, a process of expanding or contracting the sample data is executed on a time axis or a frequency axis as the signal processing.

(Supplementary Note 15)

The computer-readable recording medium according to Supplementary Note 13, wherein in the (b) step, a coding process for the sample data, an arithmetic process for a latent variable obtained by the coding process, and a decoding process for the latent variable that has been arithmetically processed are executed as the signal processing.

(Supplementary Note 16)

The computer-readable recording medium according to any of Supplementary Notes 13 to 15, wherein in the (b) step, after executing the signal processing, a similarity between a speaker feature extracted from the sample data and a speaker feature extracted from the new audio signal is obtained as the similarity, if obtained similarity is not within the set range, the signal processing is executed again.
(Supplementary Note 17)

The computer-readable recording medium according to any of Supplementary Notes 13 to 15, wherein
in the (b) step, the new audio signal is evaluated after executing the signal processing, if the evaluation result does not fall within the set range, the signal processing is executed again.
(Supplementary Note 18)

The computer-readable recording medium according to Supplementary Note 15, wherein
in the (b) step, prior to the signal processing, coding processing on another audio signal of the speaker of the sample data and an audio signal of a speaker different from the speaker of the sample data is executed to generate latent variables, the difference between the generated latent variables is calculated, and the arithmetic processing using the calculated difference is executed in the signal processing.

Although the invention of the application has been described above with reference to the example embodiment, the invention of the application is not limited to the above-described example embodiment. Various changes that can be understood by a person skilled in the art within the scope of the invention of the application can be made to the configuration and the details of the invention of the application.

INDUSTRIAL APPLICABILITY

As described above, according to the example embodiments, an extraction accuracy of the feature extractor can be improved while suppressing an increase in a cost of collecting training data required for speaker recognition. The example embodiments is useful in various fields where speaker recognition is required.

REFERENCE SIGNS LIST 10 data acquisition unit
20 data generation unit
21 audio conversion unit
22 similarity determination unit
23 evaluation confirmation unit
24 coding processing unit
25 arithmetic processing unit
26 decoding processing unit
27 second coding processing unit
28 difference calculation unit
100 audio processing apparatus (example embodiment 1)
101 audio processing apparatus (example embodiment 2)
110 computer
111 CPU
112 main memory
113 storage device
114 input interface
115 display controller
116 data reader/writer
117 communication interface
118 input apparatus
119 display apparatus
120 recording medium
121 bus
200 speaker database
300 speaker recognition apparatus

What is claimed is:

1. An audio processing method for generating training data in speaker recognition, the audio processing method comprising:
acquiring a first audio signal that is a source of the training data as sample data,
executing signal processing on the acquired sample data and generating a new second audio signal as the training data having a similarity with the sample data within a set range, and
learning the generated second audio signal as an audio signal of a speaker different from a speaker of the first audio signal.

2. The audio processing method according to claim 1, wherein
in executing the signal processing, a process of expanding or contracting the sample data is executed on a time axis or a frequency axis as the signal processing.

3. The audio processing method according to claim 1, wherein
in executing the signal processing, a coding process for the sample data, an arithmetic process for a latent variable obtained by the coding process, and a decoding process for the latent variable that has been arithmetically processed are executed as the signal processing.

4. The audio processing method according to claim 3, wherein
in executing the signal processing, prior to executing the signal processing, the coding processing on another audio signal of the speaker of the sample data and on an audio signal of a speaker different from the speaker of the sample data is executed to generate latent variables, a difference between the generated latent variables is calculated, and the arithmetic processing using the calculated difference is executed in the signal processing.

5. The audio processing method according to claim 1, wherein
in executing the signal processing, after executing the signal processing, a similarity between a speaker feature extracted from the sample data and a speaker feature extracted from the new audio signal is obtained as the similarity, and if the obtained similarity is not within the set range, the signal processing is executed again.

6. The audio processing method according to claim 1, wherein
in executing the signal processing, the new audio signal is evaluated after executing the signal processing, and if an evaluation result does not fall within the set range, the signal processing is executed again.

7. A non-transitory computer-readable recording medium storing a program for generating training data in speaker recognition by a computer, the program causing the computer to carry out:
acquiring a first audio signal that is a source of the training data as sample data,
executing signal processing on the acquired sample data and generating a new second audio signal as the training data having a similarity with the sample data within a set range, and
learning the generated second audio signal as an audio signal of a speaker different from a speaker of the first audio signal.

8. The non-transitory computer-readable recording medium according to claim 7, wherein in executing the signal processing, a process of expanding or contracting the sample data is executed on a time axis or a frequency axis as the signal processing.

9. The non-transitory computer-readable recording medium according to claim 7, wherein
in executing the signal processing, a coding process for the sample data, an arithmetic process for a latent variable obtained by the coding process, and a decoding process for the latent variable that has been arithmetically processed are executed as the signal processing.

10. The non-transitory computer-readable recording medium according to claim 9, wherein
in executing the signal processing, prior to executing the signal processing, the coding processing on another audio signal of the speaker of the sample data and on an audio signal of a speaker different from the speaker of the sample data is executed to generate latent variables, a difference between the generated latent variables is calculated, and the arithmetic processing using the calculated difference is executed in the signal processing.

11. The non-transitory computer-readable recording medium according to claim 7, wherein
in executing the signal processing, after executing the signal processing, a similarity between a speaker feature extracted from the sample data and a speaker feature extracted from the new audio signal is obtained as the similarity, and if the obtained similarity is not within the set range, the signal processing is executed again.

12. The non-transitory computer-readable recording medium according to claim 7, wherein
in executing the signal processing, the new audio signal is evaluated after executing the signal processing, and if and evaluation result does not fall within the set range, the signal processing is executed again.

13. A system comprising:
at least one processor; and
at least one memory storing instructions executable by the processor to:
acquire a first audio signal that is a source of the training data as sample data;
execute signal processing on the acquired sample data and generate a new second audio signal as the training data having a similarity with the sample data within a set range; and
learn the generated second audio signal as an audio signal of a speaker different from a speaker of the first audio signal.

14. The system according to claim 13,
wherein the at least one processor executes a process of expanding or contracting the sample data on a time axis or a frequency axis as the signal processing.

15. The system according to claim 13,
wherein the at least one processor executes, as the signal processing, a coding process for the sample data, an arithmetic process for a latent variable obtained by the coding process, and a decoding process for the latent variable that has been arithmetically processed.

16. The system according to claim 13,
wherein the at least one processor, prior to executing the signal processing, executes the coding processing on another audio signal of the speaker of the sample data and on an audio signal of a speaker different from the speaker of the sample data to generate latent variables, calculates a difference between the generated latent variables, and executes the arithmetic processing using the calculated difference in the signal processing.

17. The system according to claim 15,
wherein, in a case where the degree of similarity is larger than a predetermined value, the at least one processor adds a random number to the latent variable as the arithmetic process on the latent variable.

18. The system according to claim 13,
wherein the at least one processor, after executing the signal processing, obtains a similarity between a speaker feature extracted from the sample data and a speaker feature extracted from the new audio signal as the similarity, and if obtained similarity is not within the set range, the signal processing is executed again.

19. The system according to claim 13,
wherein the at least one processor evaluates the new audio signal after executing the signal processing, and if an evaluation result does not fall within the set range, the data generation unit executes the signal processing again.

* * * * *